(12) United States Patent
Agarwal et al.

(10) Patent No.: US 11,037,198 B2
(45) Date of Patent: Jun. 15, 2021

(54) SUGGESTING TARGETING INFORMATION FOR ADS, SUCH AS WEBSITES AND/OR CATEGORIES OF WEBSITES FOR EXAMPLE

(71) Applicant: Google LLC, Mountain View, CA (US)

(72) Inventors: Sumit Agarwal, Washington, DC (US); Brian Axe, Portola Valley, CA (US); David Gehrking, Encino, CA (US); Ching Law, Sha Tin (HK); Andrew R. Maxwell, Los Angeles, CA (US); Gokul Rajaram, Los Altos, CA (US); Leora Ruth Wiseman, Zichron Yaakov (IL)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/455,954

(22) Filed: Jun. 28, 2019

(65) Prior Publication Data

US 2019/0378169 A1   Dec. 12, 2019

Related U.S. Application Data

(63) Continuation of application No. 15/482,054, filed on Apr. 7, 2017, now Pat. No. 10,387,917, which is a (Continued)

(51) Int. Cl.
| | |
|---|---|
| *G06Q 30/00* | (2012.01) |
| *G06Q 30/02* | (2012.01) |
| *G06F 16/958* | (2019.01) |

(52) U.S. Cl.
CPC ....... *G06Q 30/0263* (2013.01); *G06F 16/958* (2019.01); *G06Q 30/02* (2013.01);
(Continued)

(58) Field of Classification Search
None
See application file for complete search history.

(56) References Cited

U.S. PATENT DOCUMENTS

| | | |
|---|---|---|
| 5,724,521 A | 3/1998 | Dedrick |
| 5,740,549 A | 4/1998 | Reilly et al. |
| | (Continued) | |

FOREIGN PATENT DOCUMENTS

| | | |
|---|---|---|
| CA | 2499778 | 4/2004 |
| JP | 2001-306608 | 11/2001 |
| | (Continued) | |

OTHER PUBLICATIONS

95/001,073, Reexamination of Stone et al.
(Continued)

*Primary Examiner* — Alvin L Brown
(74) *Attorney, Agent, or Firm* — Fish & Richardson P.C.

(57) ABSTRACT

One or more keywords and/or information about one or more properties may be accepted, and a set of one or more taxonomy categories may be determined using at least some of the keyword(s) and/or property information and perhaps term co-occurrence clusters. The determined taxonomy categories may be presented to an advertising user as an ad targeting suggestion. Each taxonomy category may have at least one associated property (e.g., Web document), that participates in an advertising network. An advertiser selection of a suggested taxonomy category may be accepted, and the serving of an ad of the advertiser may be targeted to each property associated with the selected suggested taxonomy category. Alternatively, such properties may be presented to an advertising user as an ad targeting suggestion.

20 Claims, 10 Drawing Sheets

Related U.S. Application Data continuation of application No. 13/919,173, filed on Jun. 17, 2013, now abandoned, which is a continuation of application No. 11/112,732, filed on Apr. 22, 2005, now Pat. No. 8,468,048.

(52) U.S. Cl.
CPC ..... *G06Q 30/0251* (2013.01); *G06Q 30/0272* (2013.01); *G06Q 30/0273* (2013.01); *G06Q 30/0276* (2013.01); *G06Q 30/0277* (2013.01)

(56) References Cited

U.S. PATENT DOCUMENTS

| | | | |
|---|---|---|---|
| 5,848,397 | A | 12/1998 | Marsh et al. |
| 5,948,061 | A | 9/1999 | Merriman |
| 6,026,368 | A | 2/2000 | Brown et al. |
| 6,044,376 | A | 3/2000 | Kurtzman, II |
| 6,078,914 | A | 6/2000 | Redfern |
| 6,144,944 | A | 11/2000 | Kurtzman, II et al. |
| 6,167,382 | A | 12/2000 | Sparks et al. |
| 6,185,558 | B1 | 2/2001 | Bowman et al. |
| 6,269,361 | B1 | 7/2001 | Davis et al. |
| 6,308,202 | B1 | 10/2001 | Cohn et al. |
| 6,401,075 | B1 | 6/2002 | Mason et al. |
| 6,804,659 | B1 * | 10/2004 | Graham ............. G06Q 30/02 705/14.49 |
| 6,985,882 | B1 | 1/2006 | Del Sesto |
| 7,136,875 | B2 | 1/2006 | Anderson et al. |
| 7,039,599 | B2 | 5/2006 | Merriman |
| 2001/0047354 | A1 | 11/2001 | Davis et al. |
| 2004/0133471 | A1 | 7/2004 | Pisaris-Henderson |
| 2005/0021397 | A1 | 1/2005 | Cui et al. |
| 2007/0078717 | A1 * | 4/2007 | Ho ..................... H04M 15/10 705/14.46 |
| 2010/0100437 | A1 | 4/2010 | Dean |

FOREIGN PATENT DOCUMENTS

| | | |
|---|---|---|
| JP | 2003-248688 | 9/2003 |
| JP | 2004-38370 | 2/2004 |
| JP | 2004/095335 | 11/2004 |
| KR | 2000-0012309 | 3/2000 |
| KR | 2000-0074414 | 12/2000 |
| KR | 2003-0063275 | 7/2003 |
| WO | 97/21183 | 6/1997 |

OTHER PUBLICATIONS

95/001,061, Reexamination of Stone et al.
95/001,069, Reexamination of Stone et al.
95/001,068, Reexamination of Stone et al.
Summons issued in European Application No. 05772145.8 dated Jul. 8, 2014, 8 pages.
Notice of Final Rejection in Korean Patent Application No. 10-2011-7002523 dated Jun. 28, 2013 (4 pages) with English translation (3 pages).
Notice of Preliminary Rejection during Re-examination in Korean Patent Application No. 10-2011-7002523, dated Nov. 26, 2013 (3 pages) with English translation (3 pages).
Examiner's Report from corresponding Canadian Patent Application No. 2,605,536, dated Nov. 18, 2013 (3 pgs.).
PCT International Search Report (PCT/ISA/210) for International Application No. PCT/US05/22275 (3 pgs.) (dated Oct. 26, 2006).
PCT Written Opinion of the International Searching Authority (PCT/ISA/237) for International Application No. PCT/US05/22275 (3 pgs.) (dated Oct. 26, 2006).
Dedrick, R., Interactive Electronic Advertising, IEEE, 1994.
Dedrick, R., A Consumption Model for Targeted Electronic Advertising, Intel Architecture Labs, IEEE, 1995.
Baseview Products, Inc., ClassManagerPro Administration Manual v. 1.0.5, Feb. 1, 1997.
Ad-Star.com website archive fromwww.Archive.org, Apr. 12, 1997 and Feb. 1, 1997.
Information Access Technologies, Inc., Aaddzz brochure, "The Best Way to Buy and Sell Web Advertising Space,"© 1997.
Information Access Technologies, Inc., Aaddzz.com website archive from www.Archive.org, archived on Jan. 30, 1998.
AdKnowledge Market Match Planner: Reviewer's Guide, AdKnowledge, May 1998.
AdKnowledge Campaign Manager: Reviewer's Guide, AdKnowledge, Aug. 1998.
Baseview Products, Inc., AdManagerPro Administration Manual v. 2.0, Dec. 1998.
AdForce, Inc., A Complete Guide to AdForce, Version 2.6, 1998.
AdForce, Inc., S-1/A SEC Filing, May 6, 1999.
Business Wire, "Global Network, Inc. Enters Into Agreement in Principle With Major Advertising Agency," Oct. 4, 1999.
Zeff, R. et al., Advertising on the Internet: $2^{nd}$ Ed., John Wiley & Sons, 1999.
Request for Reexamination of U.S. Pat. No. 7,240,025 B2, Control No. 95/001,073.
Request for Reexamination of U.S. Pat. No. 6,446,045 B1, Control No. 95/001,061.
Request for Reexamination of U.S. Pat. No. 7,249,059 B2, Control No. 95/001,069.
Request for Reexamination of U.S. Pat. No. 6,829,587 B2, Control No. 95/001,068.
Statement Regarding References in 1449 Form.
Communication for European Patent Application No. 05 772 145. 8-1238, dated Oct. 20, 2008 (5 pgs.).
Examiner's First Report on Australian Patent Application No. 200.5331031, dated Mar. 31, 2009.
Notice of Preliminary Rejection for Korean Patent Application No. 10-2007-7027176, dated Nov. 27, 2009 (7 pgs.) with translation (7 pgs.).
Notice of Reasons for Rejection for Japanese Patent Application No. 2008-507617, dated Apr. 13, 2010 (4 pgs.) with translation (4 pgs.).
Tanaka, Hideki, "Tip for Sales Boost in IT Era-Practical Guide to Online Advertising-from Planning to Post Click Analysis," 1st Edition, PHP Institute Office International, Inc., Apr. 10, 2001, pp. 44-49.
Notification of the First Office Action for Chinese Patent Application No. 200580050147.0, dated May 6, 2010 (4 pgs.) with translation (5 pgs.).
Notice of Final Rejection for Korean Patent Application No. 10-2007-7027176, dated Nov. 30, 2010 (4 pgs.) with translation (4 pgs.).
Statement of Grounds and Particulars in Support of Opposition with respect to Australian Patent Application No. 2005331031, dated Dec. 24, 2010 (12 pgs.).
Notice of Reasons for Rejection for Japanese Patent Application No. 2008-507617, dated Jan. 25, 2011 (5 pgs.) with translation (4 pgs.).
Notification of the Second Office Action for Chinese Patent Application No. 200580050147.0, dated Apr. 25, 2011 (5 pgs.) with translation (7 pgs.).
Notice of Preliminary Rejection for Korean Patent Application No. 10-2011-7002523, dated May 11, 2011 (7 pgs.) with translation (6 pgs.).
Examiner's Report for Canadian Patent Application No. 2,605,536, dated Feb. 8, 2012 (3 pgs.).
Notification of the Third Office Action for Chinese Patent Application No. 200580050147.0, dated Feb. 29, 2012 (4 pgs.) with translation (6 pgs.).

\* cited by examiner

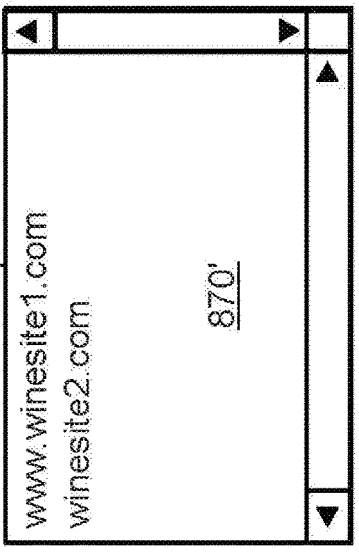
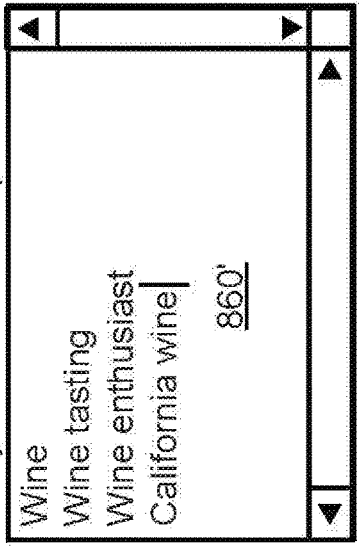
FIG. 9

| Ad Group #1 Available | Pause Ad Group | Delete Ad Group | | | | | | 1 of 1 Ad Groups |
|---|---|---|---|---|---|---|---|---|
| Current maximum CPM: USD $6.00 [edit] | | | | | | | | |
| Mar 14, 2005 to Mar 14, 2005 | | | | | | | | |
| Tools: ▶Filter sites | ▶Add sites | Edit Sites and CPMs | | | | | | |
| + Create new Image Ad | Text Ad | | | | | | | |
| Edit • Delete | | | | | | | | |
| MyImageAd – 300 x 250 pixels | | | ⦿ all time | | | | | |
| Click Image to preview ad... | | | ○ Mar ∨ 14 ∨ 2005 ∨ Mar ∨ 14 ∨ 2005 ∨ Go | | | | | |
| | | | □ | | | | | 1–8 of 8 sites |
| Delete | | | | | | | | |
| ☐ Site ▾ | Status | Max CPM | Clicks | Impr. | CTR | Avg. CPM | Cost | |
| Total | | | 0 | 0 | 0.0% | * | * | |
| ☐ www.wineloverspace.com | Available | $2.00 | 0 | 0 | 0.0% | * | * | |
| ☐ www.winesearcher.com | Available | $1.30 | 0 | 0 | 0.0% | * | * | |
| ☐ www.localwineevents.com | Available | $1.50 | 0 | 0 | 0.0% | * | * | |
| ☐ www.thatsthespirit.com | Available | $1.25 | 0 | 0 | 0.0% | * | * | |
| ☐ www.vino.com | Available | $1.45 | 0 | 0 | 0.0% | * | * | |
| ☐ www.restaurantrow.com | Available | $1.50 | 0 | 0 | 0.0% | * | * | |
| ☐ www.vinography.com | Available | $1.50 | 0 | 0 | 0.0% | * | * | |
| ☐ www.beverageworld.com | Available | $1.50 | 0 | 0 | 0.0% | * | * | |
| Delete | | | | | | | | 1–8 of 8 sites |

FIG. 11

SUGGESTING TARGETING INFORMATION FOR ADS, SUCH AS WEBSITES AND/OR CATEGORIES OF WEBSITES FOR EXAMPLE

§ 0. RELATED APPLICATION

This application is a continuation of U.S. patent application Ser. No. 15/482,054, filed on Apr. 7, 2017, which is application is a continuation of U.S. patent application Ser. No. 13/919,173, now abandoned, filed on Jun. 17, 2013, which is a continuation of U.S. patent application Ser. No. 11/112,732, now U.S. Pat. No. 8,468,048, filed on Apr. 22, 2005. The disclosure of each of the foregoing applications is incorporated herein by reference.

§ 1. BACKGROUND OF THE INVENTION

§ 1.1 Field of the Invention

The present invention concerns advertising, such as online advertising for example. In particular, the present invention concerns helping advertisers to effectively target the presentation of their ads.

§ 1.2 Background Information

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Interactive advertising provides opportunities for advertisers to target their ads to a receptive audience. That is, targeted ads are more likely to be useful to end users since the ads may be relevant to a need inferred from some user activity (e.g., relevant to a user's search query to a search engine, relevant to content in a document requested by the user, etc.). Query keyword targeting has been used by search engines to deliver relevant ads. For example, the AdWords advertising system by Google of Mountain View, Calif., delivers ads targeted to keywords from search queries. Similarly, content targeted ad delivery systems have been proposed. For example, U.S. patent application Ser. No. 10/314,427 (incorporated herein by reference and referred to as "the '427 application") titled "METHODS AND APPARATUS FOR SERVING RELEVANT ADVERTISEMENTS", filed on Dec. 6, 2002 and listing Jeffrey A. Dean, Georges R. Harik and Paul Buchheit as inventors; and Ser. No. 10/375,900 (incorporated by reference and referred to as "the '900 application") titled "SERVING ADVERTISEMENTS BASED ON CONTENT," filed on Feb. 26, 2003 and listing Darrell Anderson, Paul Buchheit, Alex Carobus, Claire Cui, Jeffrey A. Dean, Georges R. Harik, Deepak Jindal and Narayanan Shivakumar as inventors, describe methods and apparatus for serving ads relevant to the content of a document, such as a Web page for example. Content targeted ad delivery systems, such as the AdSense advertising system by Google for example, have been used to serve ads on Web pages.

An "ad network" is an aggregated set of Websites (and/or some other media properties) on which advertisers can place ads by paying a single party. Many ad networks organize their Websites by human created and maintained "verticals" (groups of related products, services, industries, and/or topics that are likely to be found in Website content). For example, "Slashdot.org" is part of the technology vertical/Computers & Technology and "iVillage" is part of the family and home vertical/Lifestyle & Communities/Womens Issues. Advertisers pay to have their ads shown on Websites that are part of these predefined verticals.

Unfortunately, the predefined verticals often only approximate the real need advertisers have in reaching their audience since target audiences might not fit (e.g., may be more granular than, might not be covered by, etc.) a predefined vertical. For example, an advertiser wanting to target student software developers might have to target their ad(s) to all Websites in a "technology" vertical to reach this audience. Thus, in ad networks that aggregate Websites belonging to a vertical or verticals, the vertical or verticals are often too broad for the needs of many advertisers.

Hierarchically arranged verticals may be used to offer narrower or broader targeting options. However, a difficult challenge for ad networks using hierarchical verticals is maintaining the vertical hierarchy. Further, if more Websites are added to a more granular vertical, or if enough advertisers demand a more granular cut of an existing vertical, then the ad targeting system may want to add a new vertical. However, even if such a new vertical is provided, advertisers might not use it. For example, the advertisers might not know of the new vertical, or the human work required to get the more granular targeting might not be worth the effort, etc.

As can be appreciated from the foregoing, present ad networks typically use manually defined vertical "buckets" or "silos" to organize their network of Websites for ad selection. This approach has many inefficiencies. For example, most ad networks only represent a set of Websites which can be organized by human judgment. These inefficiencies are exacerbated when the advertising network handles more advertisers and/or Websites.

In view of the foregoing problems with existing ad networks, it would be useful to allow advertisers to define and/or organize a set of Websites within an advertising network to meet their specific marketing needs without having to rely solely on publisher-defined and inflexible verticals.

§ 2. SUMMARY OF THE INVENTION

Embodiments consistent with the present invention may (a) accept one or more keywords, and (b) determine a set of one or more taxonomy categories using at least some of the one or more keywords. Similarly, embodiments consistent with the present invention may (a) accept information about one or more properties (e.g., Web documents), and (b) determine a set of one or more taxonomy categories using at least some of the information of the one or more properties.

In at least some embodiments consistent with the present invention, each of the taxonomy categories is a vertical category, and at least one of the set of one or more determined taxonomy categories may be presented to an advertising user as an ad targeting suggestion. Each of the taxonomy categories may have at least one property (e.g., Web document), that participates in an advertising network, associated with it.

In at least some embodiments consistent with the present invention an advertiser selection of a suggested taxonomy category may be accepted, the serving of an ad of the advertiser may be targeted to each of the at least one property (e.g., Web document) associated with the selected suggested taxonomy category. An offer for association with the selected suggested taxonomy category may be provided by the advertiser.

In at least some embodiments consistent with the present invention, a set of one or more properties (e.g., Web documents) are determined using at least some of the determined one or more taxonomy categories. Such properties (perhaps along with viewing information) may be presented to an advertising user as an ad targeting suggestion. A suggested property may be selected by a user. If so, the serving of an ad of the advertiser may be targeted to the selected suggested property. An offer for association with the selected suggested property may be accepted from the advertiser.

In at least some embodiments consistent with the present invention, the act of determining a set of one or more taxonomy categories using at least some of the keyword(s) and/or property information may be performed by determining a set of one or more semantic clusters (e.g., term co-occurrence clusters) using the accepted keyword(s) and/or property information, and determining a set of one or more taxonomy categories using at least some of the one or more semantic clusters.

§ 3. BRIEF DESCRIPTION OF THE DRAWINGS

FIGS. 8-11 illustrate how an advertiser can target the serving of its ad on certain documents, or certain types of documents, using an exemplary method consistent with the present invention.

§ 4. DETAILED DESCRIPTION

Figure 1:
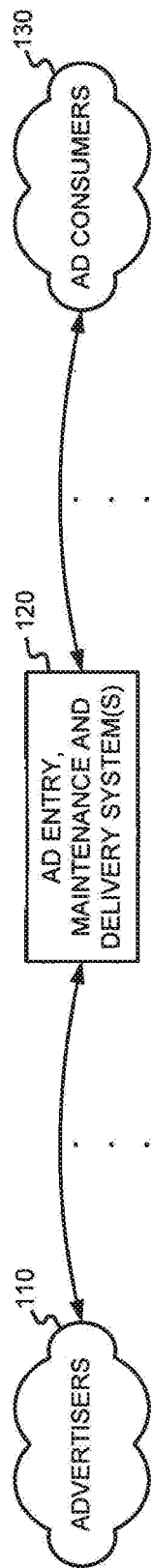
FIG. 1 is a diagram showing parties or entities that can interact with an advertising system.

The present invention may involve novel methods, apparatus, message formats, and/or data structures for helping advertisers target the serving of an advertisement. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention to include any patentable subject matter described.

In the following definitions of terms that may be used in the specification are provided in § 4.1. Then, environments in which, or with which, the present invention may operate are described in § 4.2. Exemplary embodiments of the present invention are described in § 4.3. Thereafter, a specific example illustrating the usefulness of one exemplary embodiment of the present invention is provided in § 4.4. Finally, some conclusions regarding the present invention are set forth in § 4.5.

§ 4.1 Definitions

Online ads may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a document on which, or with which, the ad was served, a search query or search results associated with the serving of the ad, a user characteristic (e.g., their geographic location, the language used by the user, the type of browser used, previous page views, previous behavior, user account, any Web cookies used by the system, user device characteristics, etc.), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document being served includes certain topics or concepts, or falls under a particular cluster or clusters, or some other classification or classifications. In some systems, an advertiser may specify that its ad is to be served only to (or is not to be served to) user devices having certain characteristics. Finally, in some systems an ad might be targeted so that it is served in response to a request sourced from a particular location, or in response to a request concerning a particular location.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

The ratio of the number of selections (e.g., clickthroughs) of an ad to the number of impressions of the ad (i.e., the number of times an ad is rendered) is defined as the "selection rate" (or "clickthrough rate") of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible.

The ratio of the number of conversions to the number of impressions of the ad (i.e., the number of times an ad is rendered) is referred to as the "conversion rate." If a conversion is defined to be able to occur within a predetermined time since the serving of an ad, one possible definition of the conversion rate might only consider ads that have been served more than the predetermined time in the past.

A "property" is something on which ads can be presented. A property may include online content (e.g., a Website, an MP3 audio program, online games, etc.), offline content (e.g., a newspaper, a magazine, a theatrical production, a concert, a sports event, etc.), and/or offline objects (e.g., a billboard, a stadium score board, and outfield wall, the side of truck trailer, etc.). Properties with content (e.g., magazines, newspapers, Websites, email messages, etc.) may be referred to as "media properties." Although properties may themselves be offline, pertinent information about a property (e.g., attribute(s), topic(s), concept(s), category(ies), keyword(s), relevancy information, type(s) of ads supported, etc.) may be available online. For example, an outdoor jazz music festival may have entered the topics "music" and "jazz", the location of the concerts, the time of the concerts, artists scheduled to appear at the festival, and types of available ad spots (e.g., spots in a printed program, spots on a stage, spots on seat backs, audio announcements of sponsors, etc.).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has an addressable storage location and can therefore be uniquely identified by this addressable location. A universal resource locator (URL) is an address used to access information on the Internet.

A "Web document" includes any document published on the Web. Examples of Web documents include, for example, a Website or a Web page.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer, Netscape, Opera, Firefox, etc.), a media player (e.g., an MP3 player, a Realnetworks streaming audio file player, etc.), a viewer (e.g., an Abobe Acrobat pdf reader), etc.

A "content owner" is a person or entity that has some property right in the content of a media property (e.g., document). A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary. A "Web publisher" is an example of a content owner.

"Verticals" are groups of related products, services, industries, content formats, audience demographics, and/or topics that are likely to be found in, or for, Website content.

A "cluster" is a group of elements that tend to occur closely together. For example, a cluster may be a set of terms that tend to co-occur often (e.g., on Web pages, in search queries, in product catalogs, in articles (online or offline) in speech, in discussion, in e-mail threads, etc.).

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

A "keyword" may be a word, phrase, or a portion of a word that conveys meaning (e.g., a root).

§ 4.2 Exemplary Advertising Environments in which, or with which, the Present Invention May Operate FIG. 1 is a high-level diagram of an advertising environment. The environment may include an ad entry, maintenance and delivery system (simply referred to as an ad server) 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or selection related to the ad occurred) to the system 120. This usage information may include measured or observed user behavior related to ads that have been served.

The ad server 120 may be similar to the one described in the '900 application. An advertising program may include information concerning accounts, campaigns, creatives, targeting, etc. The term "account" relates to information for a given advertiser (e.g., a unique e-mail address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line may have one or more ad groups, each containing one or more ads. Each ad group may include targeting information (e.g., a set of keywords, a set of one or more topics, etc.), and price information (e.g., cost, average cost, or maximum cost (per impression, per selection, per conversion, etc.)). Therefore, a single cost, a single maximum cost, and/or a single average cost may be associated with one or more keywords, and/or topics. As stated, each ad group may have one or more ads or "creatives" (That is, ad content that is ultimately rendered to an end user). Each ad may also include a link to a URL (e.g., a landing Web page, such as the home page of an advertiser, or a Web page associated with a particular product or server). Naturally, the ad information may include more or less information, and may be organized in a number of different ways.

Figure 2:
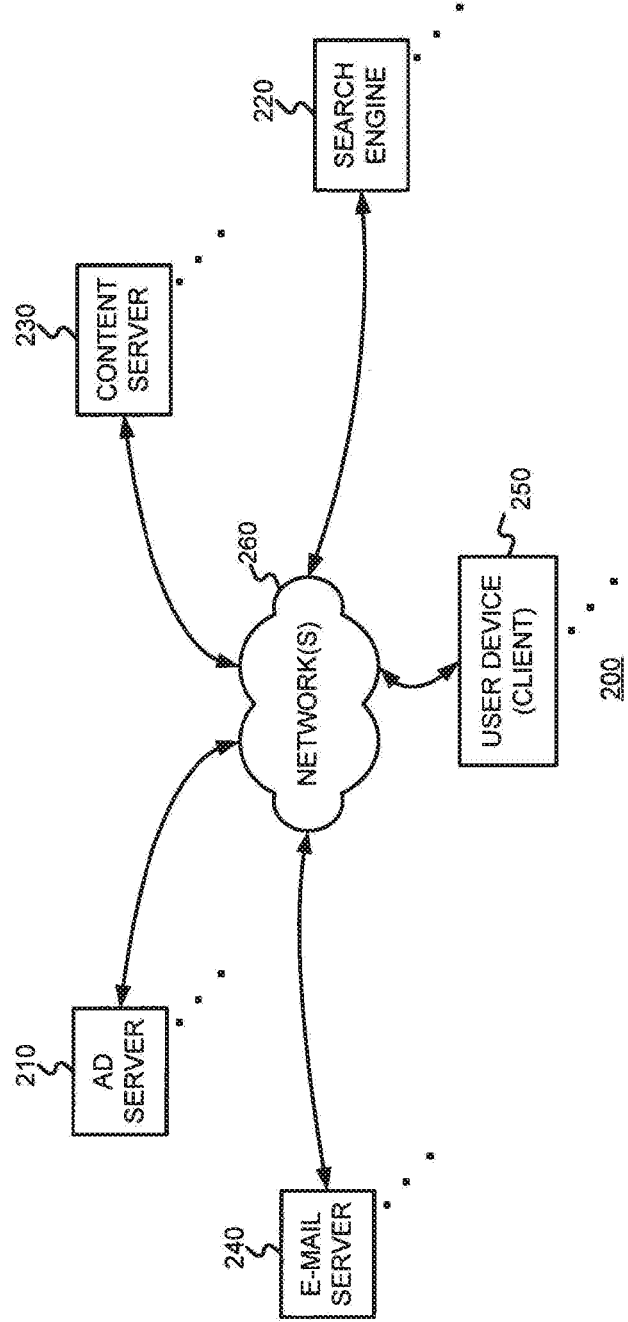
FIG. 2 is a diagram illustrating an environment in which, or with which, embodiments consistent with the present invention may operate.

FIG. 2 illustrates an environment 200 in which the present invention may be used. A user device (also referred to as a "client" or "client device") 250 may include a browser facility (such as the Explorer browser from Microsoft, the Opera Web Browser from Opera Software of Norway, the Navigator browser from AOL/Time Warner, the Firefox browser from Mozilla, etc.), an e-mail facility (e.g., Outlook from Microsoft), etc. A search engine 220 may permit user devices 250 to search collections of documents (e.g., Web pages). A content server 210 may permit user devices 250 to access documents. An e-mail server (such as GMail from Google, Hotmail from Microsoft Network, Yahoo Mail, etc.) 240 may be used to provide e-mail functionality to user devices 250. An ad server 210 may be used to serve ads to user devices 250. The ads may be served in association with search results provided by the search engine 220. However, content-relevant ads may be served in association with content provided by the content server 230, and/or e-mail supported by the e-mail server 240 and/or user device e-mail facilities.

As discussed in the '900 application, ads may be targeted to documents served by content servers. Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., page), a category or topic corresponding to the content of the document or the document request (e.g., arts, business, computers, arts-movies, arts-music, etc.), part or all of the document request, content age, content type (e.g., text, graphics, video, audio, mixed media, etc.), geo-location information, document information, etc.

The content server 230 may combine the requested document with one or more of the advertisements provided by the ad server 120/210. This combined information including the document content and advertisement(s) is then forwarded towards the end user device 250 that requested the document, for presentation to the user. Finally, the content server 230 may transmit information about the ads and how, when, and/or where the ads are to be rendered (e.g., position, selection or not, impression time, impression date, size, conversion or not, etc.) back to the ad server 120/210. Alternatively, or in addition, such information may be provided back to the ad server 120/210 by some other means.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 220 may combine the search results with one or more of the advertisements provided by the ad server 120/210. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 220 may transmit information about the ad and when, where, and/or how the ad was to be rendered (e.g., position, selection or not, impression time, impression date, size, conversion or not, etc.) back to the ad server 120/210. Alternatively, or in addition, such information may be provided back to the ad server 120/210 by some other means.

Finally, the e-mail server 240 may be thought of, generally, as a content server in which a document served is simply an e-mail. Further, e-mail applications (such as Microsoft Outlook for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under over, or otherwise in association with an e-mail.

Although the foregoing examples described servers as (i) requesting ads, and (ii) combining them with content, one or both of these operations may be performed by a client device (such as an end user computer for example).

§ 4.3 Exemplary Embodiments

As described below, in at least some embodiments consistent invention the present invention, given keyword(s) and/or document information (e.g., Website information) as input, such embodiments may return one or more relevant verticals and/or information of one or more relevant documents (e.g., information of relevant Websites belonging to an ad network) as output.

Thus, at least some embodiments consistent with the present invention may output Websites for input keywords. That is, for example, given a list of keywords, a list of Websites in an ad network that represents the verticals suggested by these keywords may be returned. Example: input query=food−>output reply=www.hungrymonster.com, foodgeeks.com, homecooking.about.com, . . . .

At least some embodiments consistent with the present invention may output verticals categories for input keywords. Thus, for example, given a list of keywords, a list of vertical categories may be returned. Example: input query=anime−>output reply=/Entertainment/Entertainment (Other)/Comics & Animation/Anime & Manga.

At least some embodiments consistent with the present invention may output Websites for input other Websites. Thus, for example, given a list of Websites, a list of Websites in an ad network, that have the same or related vertical categories, may be returned. Example: input query=www.tomshardware.com−>output reply=www.anandtech.com, www.hardocp.com, www.overclockers.com, . . . .

Figure 3:
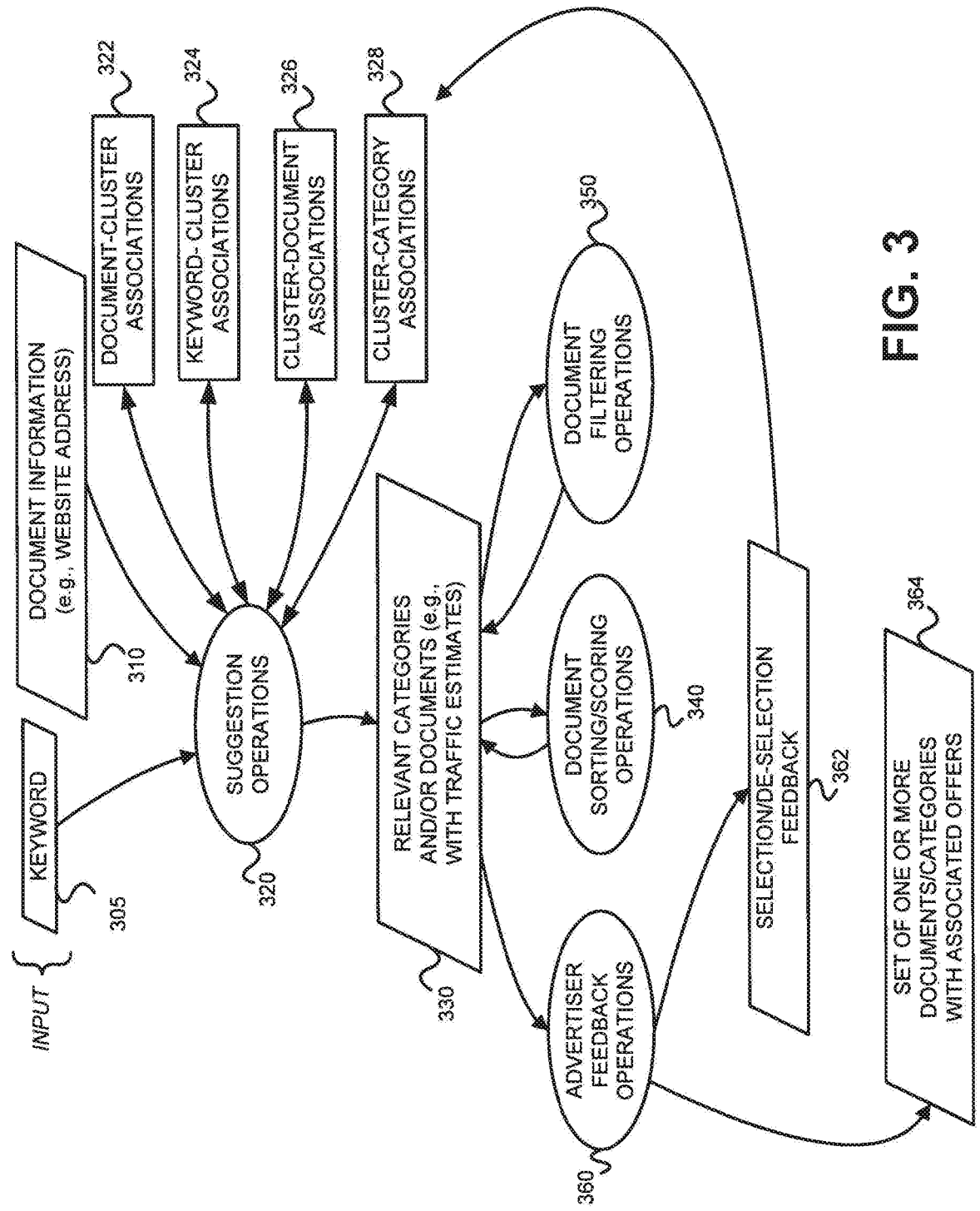
FIG. 3 is a bubble diagram of exemplary operations that may be performed in a manner consistent with the present invention, as well as information that may be used and/or generated by such operations.

FIG. 3 is a bubble diagram of exemplary operations that may be performed in a manner consistent with the present invention, as well as information that may be used and/or generated by such operations. Suggestion operations 320 may accept a keyword 305 and/or document information (e.g., a URL of a Website) and output relevant (e.g., vertical) categories and/or documents (e.g., Website).

The suggestion operations 320 may use one or more of document-cluster associations 322, keyword-cluster associations 324, cluster-document associations 326 and cluster-category associations 328 to determine relevant categories and/or documents given a keyword and/or a document. The clusters may be semantic clusters such as term co-occurrence clusters for example. For example, if a keyword is input, keyword-cluster associations 324 may be used to determine one or more clusters. At least some of the determined cluster(s) and cluster-document associations 326 may be used to determine one or more documents. Similarly, at least some of the determined cluster(s) and cluster-category associations 328 may be used to determine one or more categories. As another example, if document information is input, document-cluster associations 322 may be used to determine one or more clusters. At least some of the determined cluster(s) and cluster-document associations 326 may be used to determine one or more documents. Similarly, at least some of the determined cluster(s) and cluster-category associations 328 may be used to determine one or more categories. Suggestion operations 320 may perform data reduction and/or filtering operations to reduce/filter clusters, documents, and/or categories. If the suggestion operations 320 used categories, they 320 may be thought of as category-based suggestion operations 320.

As shown, the determined relevant categories 330 may include "traffic estimates" (e.g., number of pageviews over a given time period, number of readers, number of expected ad impressions over a given time period, etc.). As also shown, the resulting documents 330 may be scored and/or sorted by document sorting/scoring operations 340. Such documents may also be filtered by document filtering operations 350. Such operations 340 and/or 350 may be used to provide only the most relevant documents as output. Similarly, operations (not shown) may be used to score, sort, and/or filter relevant categories.

Still referring to FIG. 3, advertiser feedback operations 360 may be used to accept user input from advertisers. For example, in the context of targeting ads, an advertiser may select categories and/or documents with which they wish to serve their ads. They may also provide offer information (e.g., offer per impression, offer per selection, offer per conversion, maximum offer per impression, maximum offer per selection, maximum offer per conversion, etc.) in association with document(s) and/or categories. Thus, for example, after being provided with the vertical category "/Computers & Technology/Consumer Electronics/Audio Equipment/MP3 Players", the advertiser may wish to offer $0.50 per impression to have its ad shown on Websites belonging to this vertical category. As another example, after being provided with the top 50 Websites in the vertical category "/Automotive/Auto Parts/Vehicle Tires", the advertiser may browse the Websites (e.g., using links provided as a part of the output 330) select 12 of those Websites and provide an offer of $0.75 per impression to have its ad shown on any of the 12 selected Websites, and an offer of $5.00 per selection to have its ad shown on any of the 50 Websites provided.

Note that document selection/de-selection 362 by an advertiser may be used to adjust document-cluster associations 322 (if document information was input 310), keyword-cluster associations 324 (if keyword information was input 305), and cluster-document associations 326. Similarly, category selection/de-selection 362 by an advertiser may be used to adjust document-cluster associations 322 (if document information was input 310), keyword-cluster associations 324 (if keyword information was input 305), and cluster-category associations 328.

Referring back to associations 322, 324, 326 and 328, such associations may be indexes. Such indexes may be created and/or maintained using techniques described in U.S. patent application Ser. No. 11/112,716, which issued as U.S. Pat. No. 8,229,957 on Jul. 24, 2012 (referred to as "the '716 application" and incorporated herein by reference), titled "CATEGORIZING OBJECTS, SUCH AS DOCUMENTS AND/OR CLUSTERS, WITH RESPECT TO A TAXONOMY AND DATA STRUCTURES DERIVED FROM SUCH CATEGORIZATION", filed on Apr. 22, 2005, and listing David Gehrking, Ching Law, and Andrew Maxwell as inventors. Further, any of the other indexes or data associations described in the '716 application may be used in the context of the present invention.

§ 4.3.1 Exemplary Methods

Figure 4:
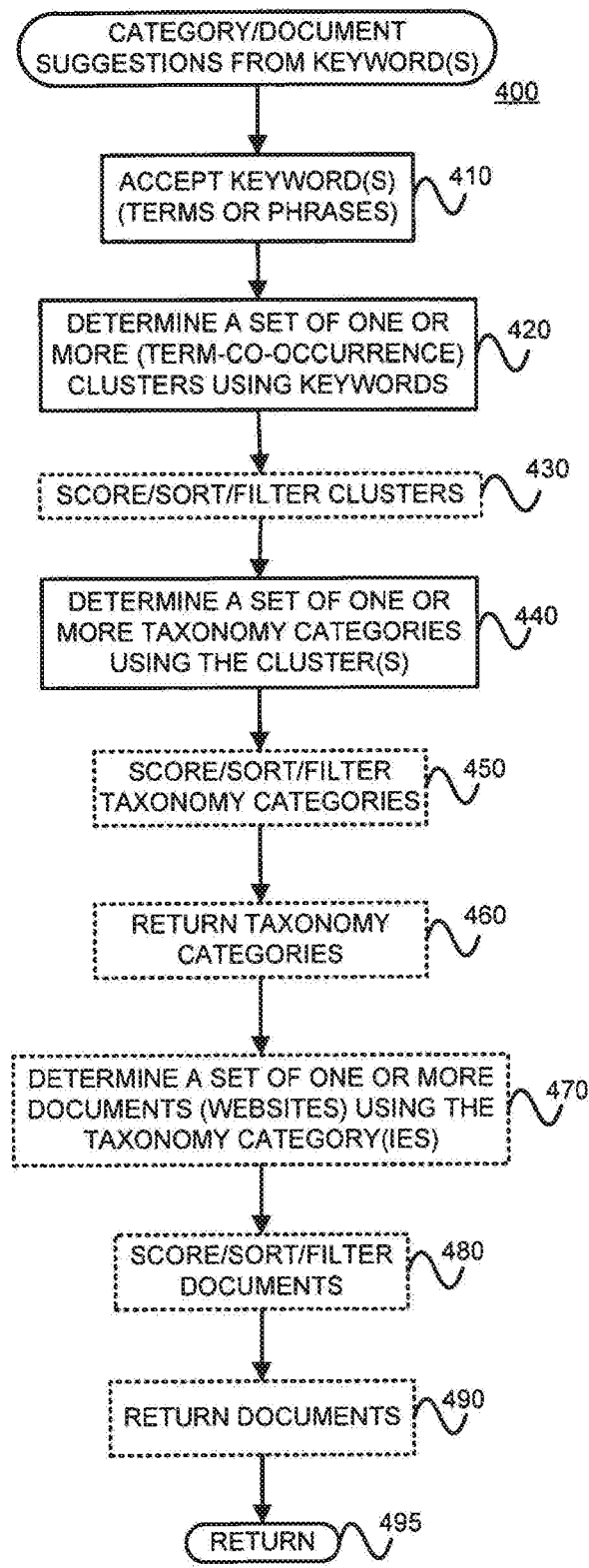
FIG. 4 is a flow diagram of an exemplary method for determining category and/or document suggestions from input keywords, in a manner consistent with the present invention.

FIG. 4 is a flow diagram of an exemplary method 400 for determining category and/or document suggestions from one or more input keywords, in a manner consistent with the present invention. One or more keywords are accepted (Block 410) and a set of one or more clusters is determined using the keyword(s) (Block 420). The clusters may be scored, sorted, and/or filtered (e.g., based on an ordering, a threshold score, etc.). (Block 430). A set of one or more taxonomy categories (e.g., verticals) may then be determined using the cluster(s). (Block 440) The categories may be scored, sorted, and/or filtered (e.g., based on an ordering, a threshold score, etc.). (Block 450) The one or more (e.g., remaining) taxonomy categories may then be returned. (Block 460). If the output is to simply include one or more categories, the method 400 may be left at this point. If, however, the output is to include one or more documents (e.g., instead of, or in addition to, categories), the method 400 may further determine a set of one or more documents using the taxonomy categories 470. The documents may be scored, sorted, and/or filtered. (Block 480) Finally, one or more (e.g., remaining) documents may then be returned. (Block 490) Various acts of the method 400 may be performed as described in the 716 application introduced above.

Figure 5:
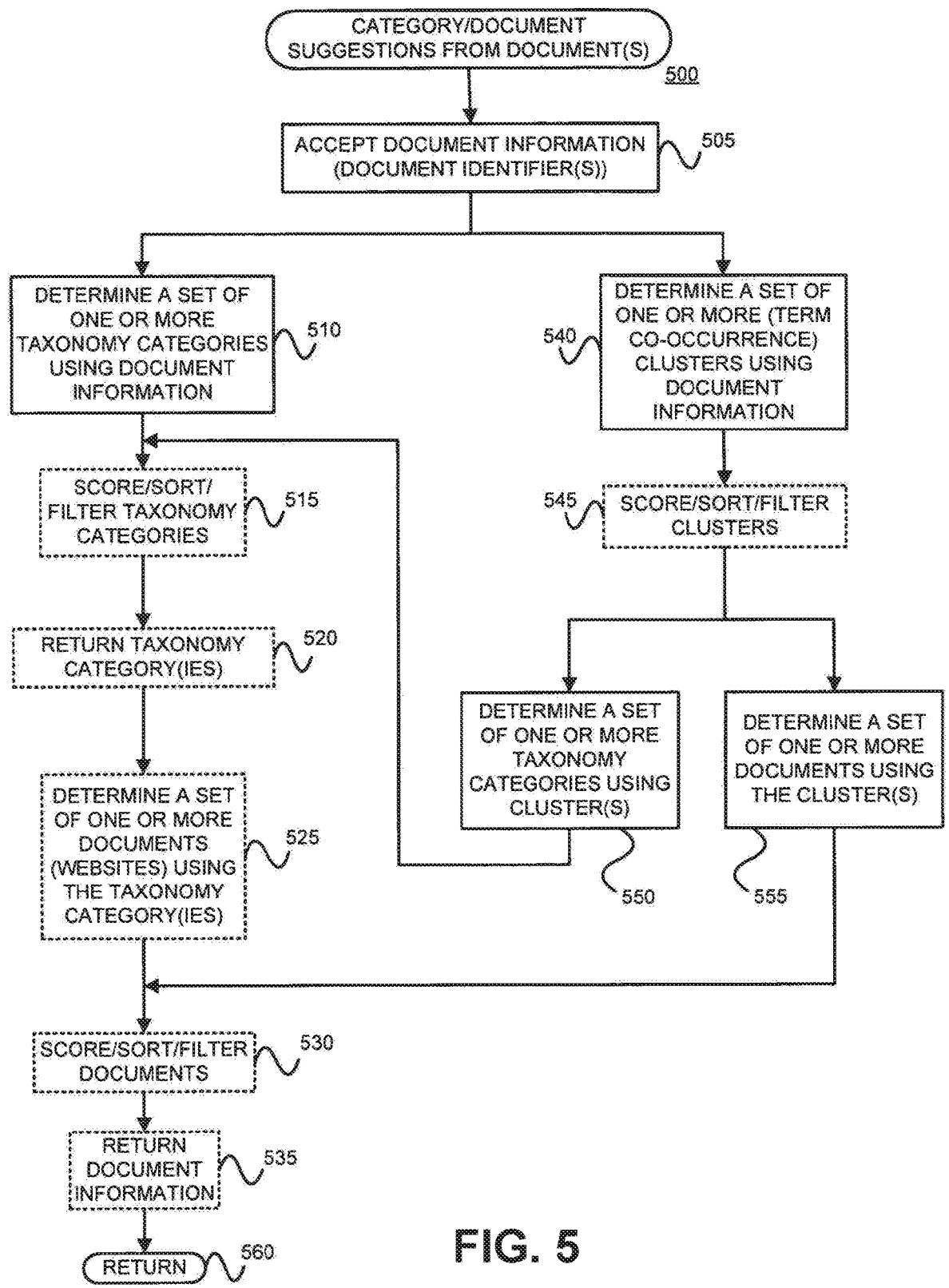
FIG. 5 is a flow diagram of an exemplary method for determining category and/or document suggestions from input documents, in a manner consistent with the present invention.

FIG. 5 is a flow diagram of an exemplary method 500 for determining category and/or document suggestions from one or more input documents, in a manner consistent with the present invention. Information (e.g., identifiers) of one or more documents is accepted (Block 505) and the method 500 may perform one or more of the acts that follow.

Referring first to the left branch of the method 500, a set of one or more taxonomy categories (e.g., verticals) is determined using the document information. (Block 510) The taxonomy categories may be scored, sorted, and/or filtered (Block 515) and the (e.g., remaining) taxonomy categories may be returned. (Block 520) A set of one or more documents (e.g., Websites) may be determined using at least some of the (e.g., remaining) taxonomy categories. (Block 525) These documents may be scored, sorted, and/or filtered (Block 530) and the (e.g., remaining) documents may be returned (Block 535) before the method 500 is left (Node 560).

Now referring to the right branch of the method 500, a set of one or more clusters may be determined using the document information. (Block 540) The clusters may be scored, sorted, and/or filtered. (Block 545). A set of one or more taxonomy categories may be determined using the (e.g., remaining) clusters (Block 550), these taxonomy categories may be used with those of block 510, and the method 500 may continue at Block 515. A set of one or more documents may be determined using the clusters (Block 555), these documents may be used with those of block 525, and the method may continue at Block 530.

Referring back to the methods 400 and 500 of FIGS. 4 and 5, the document information may be document identifiers. Thus, for example, if the documents are Web pages, the document information may be URLs, and if the documents are Websites, the document information may be URLs of the home pages of the Websites.

Still referring to FIGS. 4 and 5, the clusters may be semantic clusters, such as term co-occurrence clusters. An example of operations used to generate and/or identify such clusters is a probabilistic hierarchical inferential learner (referred to as "PHIL"), such as described in U.S. Provisional Application Ser. No. 60/416,144 (referred to as "the '144 provisional" and incorporated herein by reference), titled "Methods and Apparatus for Probabilistic Hierarchical Inferential Learner," filed on Oct. 3, 2002, and U.S. patent application Ser. No. 10/676,571 (referred to as "the '571 application" and incorporated herein by reference), titled "Methods and Apparatus for Characterizing Documents Based on Cluster Related Words," filed on Sep. 30, 2003 and listing Georges Harik and Noam Shazeer as inventors.

Still referring to FIGS. 4 and 5, filtering may be performed based on an ordering and/or based on a threshold score. Thus, for example, for an ordered set of results, filtering may be used to take only the top N results. As another example, for a scored set of results, filtering may be used to take only those results that exceed a threshold value. The threshold value may be dynamically determined or predetermine. Indeed, multiple thresholds may be used.

Figure 6:
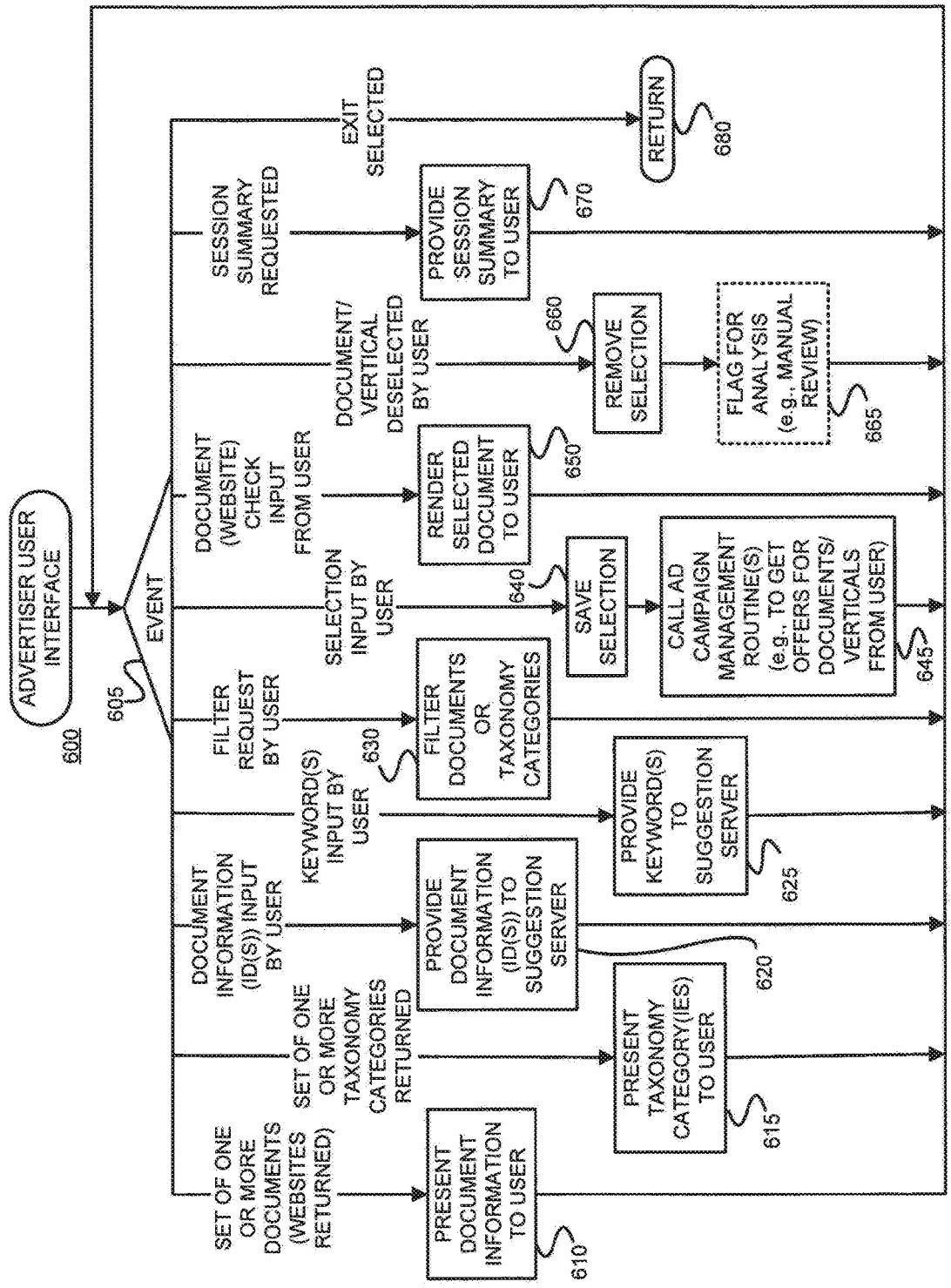
FIG. 6 is a flow diagram of an exemplary method for providing an advertiser user interface, in a manner consistent with the present invention.

FIG. 6 is a flow diagram of an exemplary method 600 for providing an advertiser user interface, in a manner consistent with the present invention. As indicated by event block 605, various branches of the method 600 may be performed in response to the occurrence of various events. For example, if a set of one or more documents is returned (Recall, e.g., 490 and 535 of FIGS. 4 and 5, respectively), information about such documents is presented to the user and the method 600 branches back to event block 605. (Block 610) If a set of one or more taxonomy categories is returned (Recall, e.g., 460 and 520 of FIGS. 4 and 5, respectively), the taxonomy categories are presented to the user and the method 600 branches back to event block 605. (Block 615) If document information is input by the user (Recall, e.g., 505 of FIG. 5), then the document information is provided to the suggestion operations as input and the method 600 branches back to event block 605. (Block 620) If one or more keywords are input by the user (Recall, e.g., 410 of FIG. 4), then the keyword(s) is provided to the suggestion operations as input and the method 600 branches back to event block 605. (Block 625) If a filter request is input by the user, documents and/or taxonomy categories may be filtered and the method 600 branches back to event block 605. (Block 630) If a selection is input by the user, the selection is saved (Block 640), ad campaign management routines may be called (Block 645) and the method 600 branches back to event block 605. If a request to check a document is input by the user, the selected document is rendered to the user and the method 600 branches back to event block 605. (Block 650) If a document and/or category is deselected by the user, the selection is removed (Block 660), the deselection may be flagged for analysis (Block 665) and the method 600 branches back to event block 605. If the user requests a session summary, a session summary is provided to the user and the method 600 branches back to event block 605. (Block 670) The method 600 may be left if the user provides an exit command. (Node 680)

Referring back to block 665, in at least one embodiment consistent with the present invention, Websites deselected from suggestion lists may be identified (e.g., flagged) for human evaluation, for example to see if they belong in a different category, or should be removed from the ad network.

§ 4.3.2 Exemplary Apparatus

Figure 7:
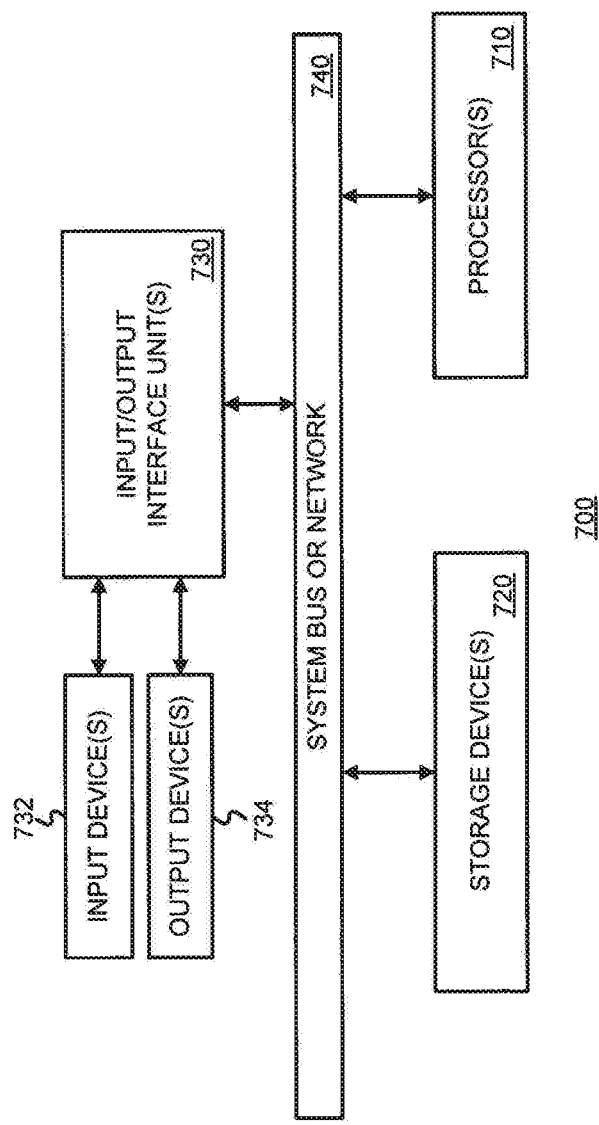
FIG. 7 is a block diagram of apparatus that may be used to perform at least some operations, and store at least some information, in a manner consistent with the present invention.

FIG. 7 is high-level block diagram of a machine 700 that may perform one or more of the operations discussed above. The machine 700 basically includes one or more processors 710, one or more input/output interface units 730, one or more storage devices 720, and one or more system buses and/or networks 740 for facilitating the communication of information among the coupled elements. One or more input devices 732 and one or more output devices 734 may be coupled with the one or more input/output interfaces 730.

The one or more processors 710 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C. to perform one or more aspects of the present invention. At least a portion of the machine executable instructions may be stored (temporarily or more permanently) on the one or more storage devices 720 and/or may be received from an external source via one or more input interface units 730.

In one embodiment, the machine 700 may be one or more conventional personal computers. In this case, the processing units 710 may be one or more microprocessors. The bus 740 may include a system bus. The storage devices 720 may include system memory, such as read only memory (ROM) and/or random access memory (RAM). The storage devices 720 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 732, such as a keyboard and pointing device (e.g., a mouse) for example. Other input devices such as a microphone, a joystick, a game pad, a satellite dish, a scanner, or the like, may also be (or alternatively) be included. These and other input devices are often connected to the processing unit(s) 710 through an appropriate interface 730 coupled to the system bus 740. The output devices 734 may include a monitor or other type of display device, which may also be connected to the system bus 740 via an appropriate interface. In addition to (or instead of) the monitor, the personal computer may include other (peripheral) output devices (not shown), such as speakers and printers for example.

Referring back to FIG. 2, one or more machines 700 may be used as end user client devices 250, content servers 230, search engines 220, email servers 240, and/or ad servers 210.

§ 4.3.3 Refinements and Alternatives

Although many of the exemplary embodiments are described in the context of online documents such as Websites, embodiments consistent with the present invention may be used in the context of offline media properties such as newspapers, periodicals, theatrical performances, concerts, sports events, etc. However, information about such offline media properties should be available in machine readable form.

At least some embodiments consistent with the present invention may allow advertisers to filter Website outputs, for example, so that the number of Websites returned is limited, so that the languages of the returned Websites are restricted, etc.

In at least some embodiments consistent with the present invention, for a single keyword query, the results of Keywords→Verticals and Keywords→Websites may be combined to generate a general set of Websites of all senses of the keyword, plus the top Websites associated with the verticals suggested by the keyword. Advertising users may then refine their general Website lists by sense (vertical).

In at least some embodiments consistent with the present invention, the advertiser user may to enter Websites not in the ad network to find similar Websites that are in the ad network. In such embodiments, document-cluster associations (Recall, e.g., 322 of FIG. 3) will not be limited to documents (Websites) in the ad network. Websites outside of the advertising network may be crawled on demand, or pre-crawled and indexed (particularly if demand is high).

At least some embodiments consistent with the present invention may permit the Websites to be sorted for review by various attributes (e.g. relevancy to the keywords or Websites entered by the advertiser, Website pageviews, CPM price of the Website, etc.).

At least some embodiment s consistent with the present invention may group suggested Websites in order to allow the advertiser user to easily set an offer (e.g., a per impression bid) across a large number of Websites. For example, Website suggestions may be grouped by relevancy to the keywords or Websites entered by the advertiser, Website pageviews, CPM price of the Website, etc. At least some embodiments consistent with the present invention may estimate ad impressions (or selections, or conversions)

across such a group of Websites given CPM (price per impression) or CPC (price per click) offer information.

In at least some embodiments consistent with the present invention Websites deselected from Website suggestion lists may be tagged for human evaluation to help improve the Website selection and/or scoring (e.g., relevancy) algorithm. Alternatively, or in addition, human evaluation may be used to determine if the Websites should be removed from the ad network (e.g., due to quality issues).

In at least some embodiments consistent with the present invention, if a Website selected, but is not active (e.g., because it is not in the ad network, because the Website publisher has not given permission to publicly name its Website as part of the ad network, etc.), the advertiser's ads may automatically become eligible for serving with the Website if and when the Website becomes part of the ad network.

In at least some embodiments consistent with the present invention, Website owners (or owners of some other properties) may provide additional data such as Website description, audience demographics, and/or other structured or unstructured data. In at least some embodiment consistent with the present invention, advertiser users may use such additional data for searching and/or sorting results.

§ 4.4 Examples of Operations

Example 1

Figure 8:
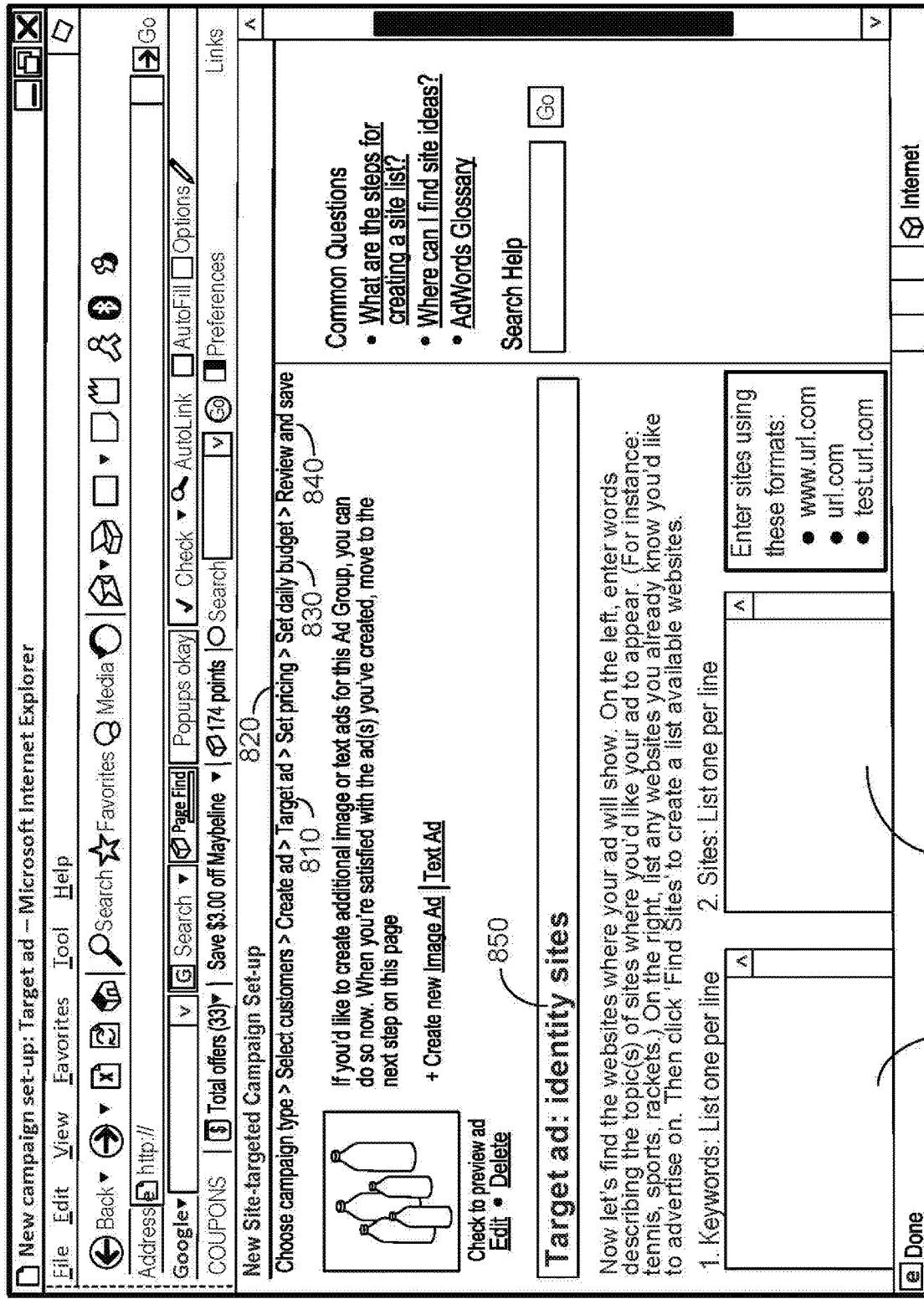

FIGS. 8-11 illustrate exemplary user interfaces, consistent with an exemplary embodiment consistent with the present invention, which illustrate an exemplary use of the embodiment. Suppose an advertiser—"Blue Ridge Beverages"—wants to place one of its ads on certain Websites. In the past, the advertiser might have to either (a) negotiate placing its ad on various Websites concerning wine, or (b) have its ad run on an ad network, likely in an overly-broad category (e.g., food and beverages). FIG. 8 illustrates a display screen 800 including a portion of a Webpage, consistent with the present invention, for helping the advertiser target the serving of its ad on relevant Webpages of an ad network. The user may have selected "Target ad" hypertext 810 to obtain the display screen 800. (Further hypertext to, for example, "Set pricing" 820, "Set daily budget" 830 and "Review and save" 840 may also be provided.) Section 850 of the display screen 800 is used to help the advertiser identify Websites on which it may wish to target its ads. The advertiser may provide keywords and/or Websites that it believes are relevant in boxes 860 and 870, respectively.

As an example, the advertiser may already participate in ad search query keyword relevant advertising (e.g., AdWords from Google) and may use certain keywords (e.g., Wine, Wine tasting, Wine enthusiast, and California wine) in that campaign. Naturally, the source of the keywords need not be a preexisting search query keyword relevant ad campaign. As another example, the advertiser may know that it wants advertise on certain Websites (e.g., www.winesite1.com, and winesite2.com) of which it is already aware. FIG. 9 illustrates a portion 900 of a display screen having a section 850' in which blocks 860' and 870' include advertiser entered keywords and Websites, respectively. The advertiser may then request relevant Websites belonging to the ad network by selecting the "Find Sites >" button 910.

Figure 10:
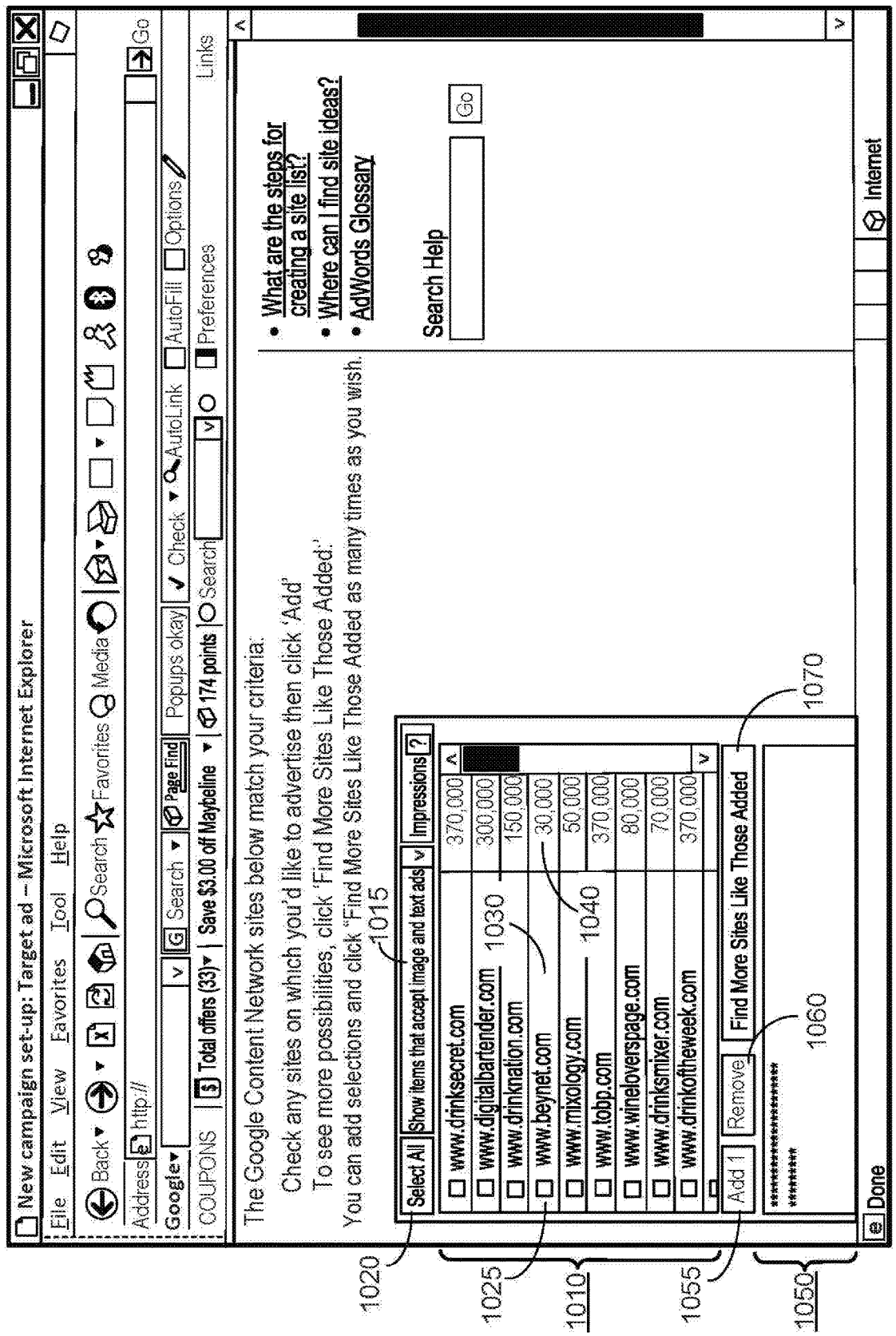

FIG. 10 illustrates a display screen 1000 including a portion of a Webpage including results of the "Find Sites" request, given the input keywords and Websites shown in blocks 860' and 870' of FIG. 9. The results 1010 include a number of entries. The advertiser may filter the resulting Websites. For example, drop down menu 1015 may allow the advertiser to show only those Websites that accept text and image ads, Websites that accept image ads, Websites that accept text ads, etc. Each of the entries may include a Website address 1030 with a link to the Website. In this way, an advertiser can view the Website by selecting the hypertext link 1030. Each entry may also include statistics for the Website, such as the number of impressions (pageviews) per day 1040 for example. The advertiser may add or remove Websites to a set of one or more Websites, shown in box 1050, on which the advertiser wishes to show its ad. For example, the advertiser may check boxes 1025 and may use buttons 1055 and 1060 to add and remove, respectively, such Websites. A button 1020 may be provided to allow all entries to be selected (checked) by the advertiser. Finally, as shown, a button 1070 may be provided to allow the advertiser to use the Websites in the box 1050 as input (just as the Websites listed in the box 870' were used) to find other Websites (e.g., Websites categorized in the same or similar vertical categories as the input Website(s)).

Suppose that the advertiser has added a number of Websites to a set of Websites that it wants to serve its ad with. A portion of the Webpage (not shown) displayed on screen 1000 may include a command element (e.g., like 820, 830, 840 of FIG. 8) to allow the advertiser to provide ad campaign information used to target the serving of its ad on various ones of the selected Websites. Referring to FIG. 11 for example, a screen portion 1100 may include information about the ad creative, such as a thumbnail image of the ad 1110, as well as a number of entries 1120. Each entry may include a check box 1130, a text (perhaps with a link) of the Website 1140, status information about whether or not the Website participates presently in the ad network 1150, offer information entered by the advertiser 1160, and various statistics of the ad 1170 such as selections (clicks), impressions, selection rates (CTRs), average cost per thousand impressions (CPM), total cost, etc. Date range information for the ad campaign may also be provided by the advertiser as indicated by tool elements 1180.

Although the foregoing example illustrates how embodiments consistent with the present invention may be used to suggest Websites to be targeted by an advertiser, the present invention is not limited to such embodiments. For example, as discussed above, embodiments consistent with the present invention may be used to suggest vertical categories to be targeted by the advertiser.

Example 2

Suppose BMW wants to set up a brand-building ad campaign within an ad network. For example, suppose it has a "BMW—as refined as fine wine" ad campaign in which they want to target to wine drinkers (who are highly correlated with luxury car buyers). BMW may use a Website suggestion tool consistent with the present invention to enter wine.com and winespectator.com (Recall, e.g., 870 of FIG. 8) as two examples of Websites its wants to target. The Website suggestion tool looks up both entered Websites and finds the most popular clusters (e.g., phil clusters) for each. (Recall, e.g., 322 of FIG. 3.)

Using the clusters, the Website suggestion tool can use cluster-document associations (Recall, e.g., 326 of FIG. 3), and/or cluster-category associations (Recall, e.g., 328 of FIG. 3) and category-document associations to return the top N (e.g., N=500) Websites sorted by a relevancy score.

Using a filtering tool, BMW can focus on the vertical categories and/or Websites that it believes are the most relevant. Interesting statistics such as pageviews, min CPM (e.g., as specified by Web publishers) and average CPM (e.g., of offers by other advertisers for the Website) for the Website may be provided to the advertiser. BMW may use filtering and checkbox selection to pick the Websites for which to bid a particular CPM, and applies that CPM to the selected Websites. These settings can later be tweaked using the same mechanism. Suppose BMW enters a "max number of times a user can view ad" frequency cap of 3 to get a daily pageviews estimate of 200K and a daily spend estimate of $1,000.00.

Suppose that as BMW scans the list of Websites, a couple of the Websites look questionable and after clicking on them and reviewing the content of the Website, it deselects these Websites from the list. These deselections may be flagged for (e.g., manual) quality review.

Suppose BMW has a large enough budget to expand the list further, so they click an "add more sites" button and enter "fine cuisine" as a keyword. (Recall, e.g., box 860 of FIG. 8.) Suppose another 100 Websites are returned, most of which are only loosely relevant. Nonetheless, suppose that BMW still finds 15 Websites which they select (e.g., they can deselect all and select just these 15) and sets a CPM bid of $3 for this set of Websites.

Finally, suppose that BMW leaves an "automatically notify me of new sites similar to my target list" selection tool element checked. Consequently, suppose that two weeks later that BMW is notified that new Websites have been added to the ad network that are considered relevant, with an invitation to add these Websites to BMW's set of targeted Websites.

Suppose that a final summary (Recall, e.g., hypertext 840 of FIG. 8) gives a daily page view estimate of 300K and daily spend estimate of $1,250.00 which meets BMWs target spend.

Example 3

Referring Suppose that Google wants to advertise for software developers and sets up a "Google developers wanted" text ad in AdWords. Suppose further that Google enters "Slashdot.com" and "freshmeat.com" into the Website suggestion tool. (Recall, e.g., box 870 of FIG. 8.) A list of developer community Websites including Slashdot are presented to the advertiser as output. Suppose that the Website "Freshmeat" is not in the ad network, so it is shown as "inactive". Although Google may have initially only wanted to advertise on Slashdot, it may change its mind after being presented with 10 very similar "developer community websites." Consequently, it may decide to bid $5.00 CPM on all of them. Suppose Google doesn't want to be notified of new Websites, and therefore unchecks the "automatically notify me of new sites similar to my target list" checkbox. Suppose further that Google uses a default "max number of times a user can view ad" value of 5, since presenting users with the ad more than this may be perceived to be "spammy."

Suppose that later, the Website "Freshmeat" joins the ad network. In this case, the $5.00 CPM bid on the "Freshmeat.com" Website may automatically become active.

§ 4.5 Conclusions

As can be appreciated from the foregoing, embodiments consistent with the present invention can be used to help advertisers to better target their advertising campaign by providing relevant media properties (e.g., Websites or Webpages), and/or relevant vertical categories in response to keywords and/or Websites provided by the advertiser. More granular verticals, customized to advertiser input (e.g., keywords, demographics, etc.), can be supported. For example, an advertiser could choose/Computers & Technology and then narrow it by searching on the keyword "Mac".

What is claimed is:

1. A method, comprising:
   receiving, by one or more processors and through a user interface, text input by a content distributor;
   determining, by the one or more processors, a set of one or more vertical categories using the text, wherein each vertical category among the set of one or more vertical categories has at least one Web document associated with the vertical category, and wherein the at least one Web document participates in a content distribution network;
   outputting, by the one or more processors and through the user interface, the set of one or more determined vertical categories for presentation to the content distributor as a targeting suggestion;
   receiving, by the one or more processors and from the content distributor, selection of a particular vertical category from among the set of one or more determined vertical categories;
   outputting, by the one or more processors and through the user interface, a traffic estimate; and
   targeting, by the one or more processors, serving of content of the content distributor to each of the at least one Web document associated with the selected particular vertical category, including distributing the content to the at least one Web document.

2. The method of claim 1, wherein outputting the set of one or more determined vertical categories comprises outputting, through the user interface, information identifying a hierarchical vertical category of the web documents included in a particular cluster of web documents.

3. The method of claim 2, wherein outputting the information further comprises outputting information and information identifying one or more of the web documents that are included in the particular cluster.

4. The method of claim 2, wherein the hierarchical vertical category of the web documents includes web documents that identify a particular product, web documents that identify a particular service, web documents that identify a particular industry, or web documents that identify a particular topic.

5. The method of claim 2, further comprising identifying, from among multiple different clusters, the particular cluster that has at least a threshold term co-occurrence value for the text.

6. The method of claim 5, wherein identifying, from among the multiple different clusters, the particular cluster that has at least the threshold term co-occurrence value for the text comprises determining that the text is included, at least the threshold term co-occurrence value number of times, in the web documents of the particular cluster.

7. The method of claim 5, wherein identifying, from among the multiple different clusters, the particular cluster that has at least the threshold term co-occurrence value for the text comprises determining that the text is included, at least the threshold term co-occurrence value number of times, in search queries that retrieve the web documents of the particular cluster.

8. An apparatus comprising:
one or more processors;
at least one input device;
at least one output device; and
one or more storage devices storing processor executable instructions that, when executed by the one or more processors, cause the one or more processors perform operations comprising:
receiving, through a user interface, text input by a content distributor,
determining a set of one or more vertical categories using the text, wherein each vertical category among the set of one or more vertical categories has at least one Web document associated with the vertical category, and wherein the at least one Web document participates in a content distribution network;
outputting, through the user interface, the set of one or more determined vertical categories for presentation to the content distributor as a targeting suggestion;
receiving, from the content distributor, selection of a particular vertical category from among the set of one or more determined vertical categories;
outputting, through the user interface, a traffic estimate; and
targeting serving of content of the content distributor to each of the at least one Web document associated with the selected particular vertical category, including distributing the content to the at least one Web document.

9. The apparatus of claim 8, wherein outputting the set of one or more determined vertical categories comprises outputting, through the user interface, information identifying a hierarchical vertical category of the web documents included in a particular cluster of web documents.

10. The apparatus of claim 9, wherein outputting the information further comprises outputting information and information identifying one or more of the web documents that are included in the particular cluster.

11. The apparatus of claim 9, wherein the hierarchical vertical category of the web documents includes web documents that identify a particular product, web documents that identify a particular service, web documents that identify a particular industry, or web documents that identify a particular topic.

12. The apparatus of claim 9, further comprising identifying, from among multiple different clusters, the particular cluster that has at least a threshold term co-occurrence value for the text.

13. The apparatus of claim 12, wherein identifying, from among the multiple different clusters, the particular cluster that has at least the threshold term co-occurrence value for the text comprises determining that the text is included, at least the threshold term co-occurrence value number of times, in the web documents of the particular cluster.

14. The apparatus of claim 12, wherein identifying, from among the multiple different clusters, the particular cluster that has at least the threshold term co-occurrence value for the text comprises determining that the text is included, at least the threshold term co-occurrence value number of times, in search queries that retrieve the web documents of the particular cluster.

15. A non-transitory computer-readable medium storing software comprising instructions executable by one or more computers which, upon such execution, cause the one or more computers to perform operations comprising:
receiving, through a user interface, text input by a content distributor,
determining a set of one or more vertical categories using the text, wherein each vertical category among the set of one or more vertical categories has at least one Web document associated with the vertical category, and wherein the at least one Web document participates in a content distribution network;
outputting, through the user interface, the set of one or more determined vertical categories for presentation to the content distributor as a targeting suggestion;
receiving, from the content distributor, selection of a particular vertical category from among the set of one or more determined vertical categories;
outputting, by the one or more processors and through the user interface, a traffic estimate; and
targeting serving of content of the content distributor to each of the at least one Web document associated with the selected particular vertical category, including distributing the content to the at least one Web document.

16. The non-transitory computer-readable medium of claim 15, wherein outputting the set of one or more determined vertical categories comprises outputting, through the user interface, information identifying a hierarchical vertical category of the web documents included in a particular cluster of web documents.

17. The non-transitory computer-readable medium of claim 16, wherein outputting the information further comprises outputting information and information identifying one or more of the web documents that are included in the particular cluster.

18. The non-transitory computer-readable medium of claim 16, wherein the hierarchical vertical category of the web documents includes web documents that identify a particular product, web documents that identify a particular service, web documents that identify a particular industry, or web documents that identify a particular topic.

19. The non-transitory computer-readable medium of claim 16, further comprising identifying, from among multiple different clusters, the particular cluster that has at least a threshold term co-occurrence value for the text.

20. The non-transitory computer-readable medium of claim 19, wherein identifying, from among the multiple different clusters, the particular cluster that has at least the threshold term co-occurrence value for the text comprises determining that the text is included, at least the threshold term co-occurrence value number of times, in the web documents of the particular cluster.

* * * * *